United States Patent [19]

Chang

[11] Patent Number: 5,434,882
[45] Date of Patent: Jul. 18, 1995

[54] INJECTION-CONTROLLED LASER RESONATOR

[75] Inventor: Jim J. Chang, Dublin, Calif.

[73] Assignee: The United States of America as represented by the United States Department of Energy, Washington, D.C.

[21] Appl. No.: 226,589

[22] Filed: Apr. 12, 1994

[51] Int. Cl.6 .................. H01S 3/082; H01S 3/098
[52] U.S. Cl. ........................... 372/92; 372/19; 372/95
[58] Field of Search ............. 372/92, 95, 98, 71, 372/18, 55, 56

[56] References Cited

U.S. PATENT DOCUMENTS 5,173,918  12/1992  Townshend ..................... 372/55

OTHER PUBLICATIONS

Hargrove, R. S. et al. "Copper Vapor Laser Unstable Resonator Oscillator and Oscillator-Amplifier Characteristics" IEEE Journal of Quant. Elec. 15(11) Nov. 1979, pp. 1228–1232.

"Self-Imaging Injection-Locked Copper Laser Oscillator" by Jim Chang et al, Summaries of papers presented at the Conference on Lasers and Electro-Optics, May 2–3, 1993. Technical Digest Series, vol. 11.

*Primary Examiner*—Rodney B. Bovernick
*Assistant Examiner*—Robert McNutt
*Attorney, Agent, or Firm*—Miguel A. Valdes; Roger S. Gaither; William R. Moser

[57] ABSTRACT

A new injection-controlled laser resonator incorporates self-filtering and self-imaging characteristics with an efficient injection scheme. A low-divergence laser signal is injected into the resonator, which enables the injection signal to be converted to the desired resonator modes before the main laser pulse starts. This injection technique and resonator design enable the laser cavity to improve the quality of the injection signal through self-filtering before the main laser pulse starts. The self-imaging property of the present resonator reduces the cavity induced diffraction effects and, in turn, improves the laser beam quality.

20 Claims, 5 Drawing Sheets

*PRIOR ART*

INJECTION-CONTROLLED LASER RESONATOR

STATEMENT OF GOVERNMENT RIGHTS

The United States Government has rights in this invention pursuant to Contract No. W-74-5-ENG-48 between the United States Department of Energy and University of California.

BACKGROUND OF THE INVENTION

1. Field of the Invention

The present invention relates in general to the field of laser resonators, and more particularly to a new injection-controlled laser resonator which incorporates self-filtering, self-imaging, and adjoint-coupled injection features.

2. Background Art

Figure 1:
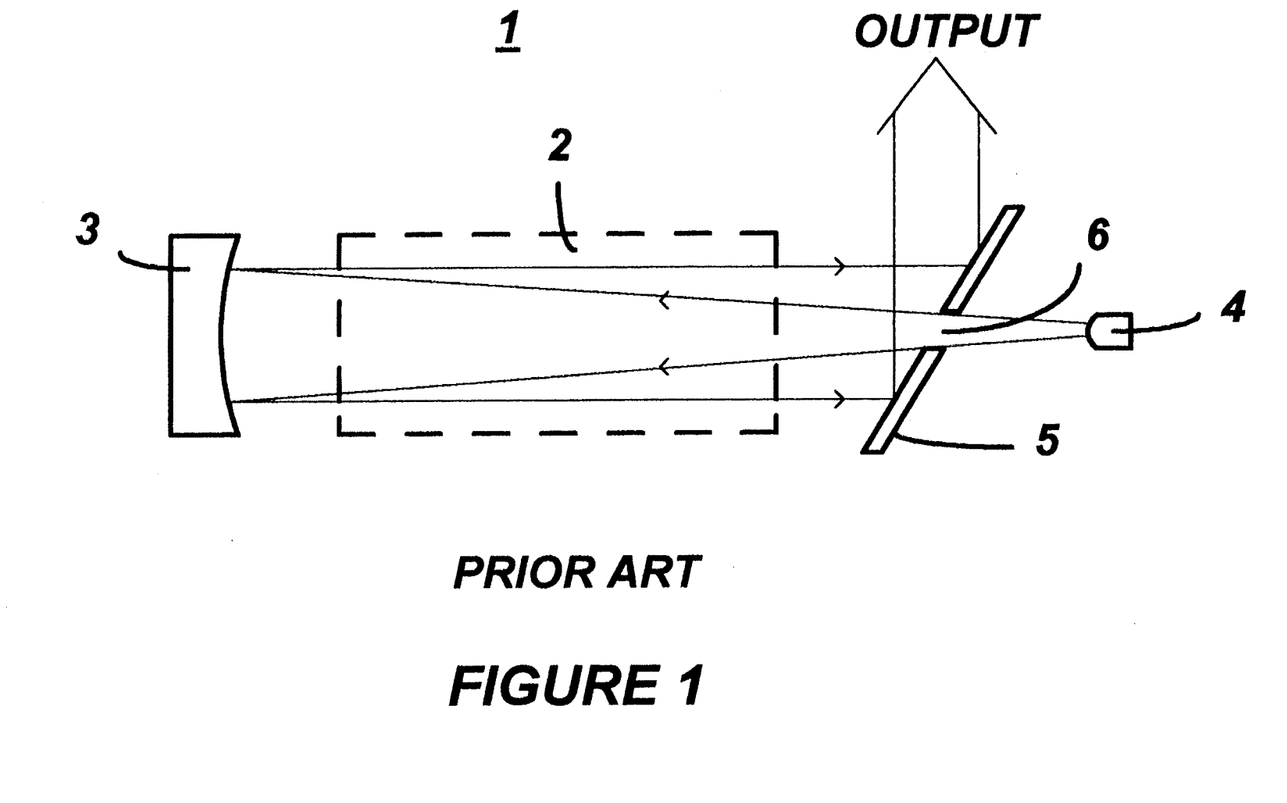
FIG. 1 is a simplified schematic elevational view of a conventional laser system.

A conventional laser system 1 is illustrated in FIG. 1 typically includes a gain medium 2 such as plasma, solid state crystals or similar gain media used for signal amplification, and a cavity resonator which comprises two reflective surfaces or cavity mirrors 3 and 4 that are oppositely disposed relatively to the gain medium 2, such that part of the laser beam is trapped in the resonance cavity and is re-amplified by the gain medium. As known in the art, pump means are provided for pumping the gain medium to a pumped state. For a copper vapor lasers, the pump means includes means for promoting the vapor state of copper lasing material. A typical laser system includes the use of a highly reflective concave cavity mirror 3 and a reflective convex cavity mirror 4, with a scraper mirror 5 in between for the laser output. When the lasing atoms are excited, they emit photons in the gain medium.

The photons are initially emitted in all directions, and some of which impinge upon the concave cavity mirror 3, which causes these photons to be reflected back through the gain medium 2 where they are re-amplified. The laser beam is then intercepted by the scraper mirror 5 as an output beam. Part of the laser beam passes through a central feedback aperture 6 in the scraper mirror 5, for impinging on the convex cavity mirror 4. The latter mirror 4 reflects the impinging laser beam back divergently through the feedback aperture 6 and the gain medium 2 where it is re-amplified before impinging upon the highly reflective concave mirror 3.

The foregoing resonance cycle is then repeated, and the lasing operation proceeds. The laser beam which is trapped between the two cavity mirrors 3 and 4, within the resonance cavity, forms resonator or laser modes. Numerous designs of laser resonators have already been developed, and can be generally classified as in two categories: stable and unstable resonators. The resonator is said to be stable if it satisfies the following equation:

$$0 < (1 - L/R1)*(1 - L/R2) < 1,$$

where L is the distance between the two cavity mirrors; R1 is the radius of one of the cavity mirrors; and R2 is the radius of the other cavity mirror. If a resonator does not satisfy the foregoing equation, it is said to be unstable.

A stable resonator has a lower cavity loss than an unstable resonator, but requires a longer time for its cavity modes to be developed. A stable resonator is mostly used in low gain, long pulse or continuous wave laser systems. An unstable resonator has a higher cavity loss than the stable resonator, and does not require as much time for its cavity modes to be developed. An unstable resonator is mostly used in high gain, short pulse laser systems.

Another distinction between the stable and the unstable resonators is that a stable resonator has a magnification factor (M) of one, while the magnification factor M of an unstable resonator is defined as the ratio of the mirror radii, as follows:

$$M = R1/R2.$$

Thus, a laser beam that is transmitted through the resonance cavity will be magnified by a factor M after one cavity round trip. As used herein, a cavity round trip means the main and the return trajectories traveled by the laser beam between the two cavity mirrors. The higher the magnification factor M, the faster the cavity modes can be developed.

Even though laser modes can be developed relatively quickly using high magnification (i.e., M greater than 10) unstable resonators, the time required for such development may still be too long for some short pulse laser systems. For example, the typical time required for the development of oscillator modes in high gain lasers, such as copper lasers and excimer lasers, is in the order of a few tens of nanoseconds (i.e., 30 nsec.) using high magnification unstable resonators, which is in the order of the entire laser pulse duration (i.e., 60 nsec.). Therefore, the front part of the laser pulse, which contributes a large amount of output energy, is not a well developed resonator mode, and is therefore highly divergent (i.e., poor beam quality).

In order to achieve a low divergence output beam for obtaining a good beam quality for the entire duration of the laser pulse, injection control techniques are usually applied. An injection signal is generated by means of a lower power laser, which is referred to as the master oscillator (MO), and the output laser pulse will be composed of two parts, a leading part and a trailing part. When an unstable resonator is used as the master oscillator, the trailing part of the output laser has a developed resonator mode (i.e., low beam divergence) and can be used as a seeding beam for injection purposes. The main or high power laser which uses either a stable or unstable resonator, is then injected with the seeding beam, which has a relatively good beam quality. As a result, the high power laser pulse from the injection seeded oscillator (ISO), which is initially seeded with a low divergence laser pulse, can maintain the low divergence mode for the entire duration of the laser pulse. This approach constitutes a substantial improvement over a free-running oscillator which can only develop a low-divergence laser beam for the trailing part of the output laser pulse.

Figure 2:
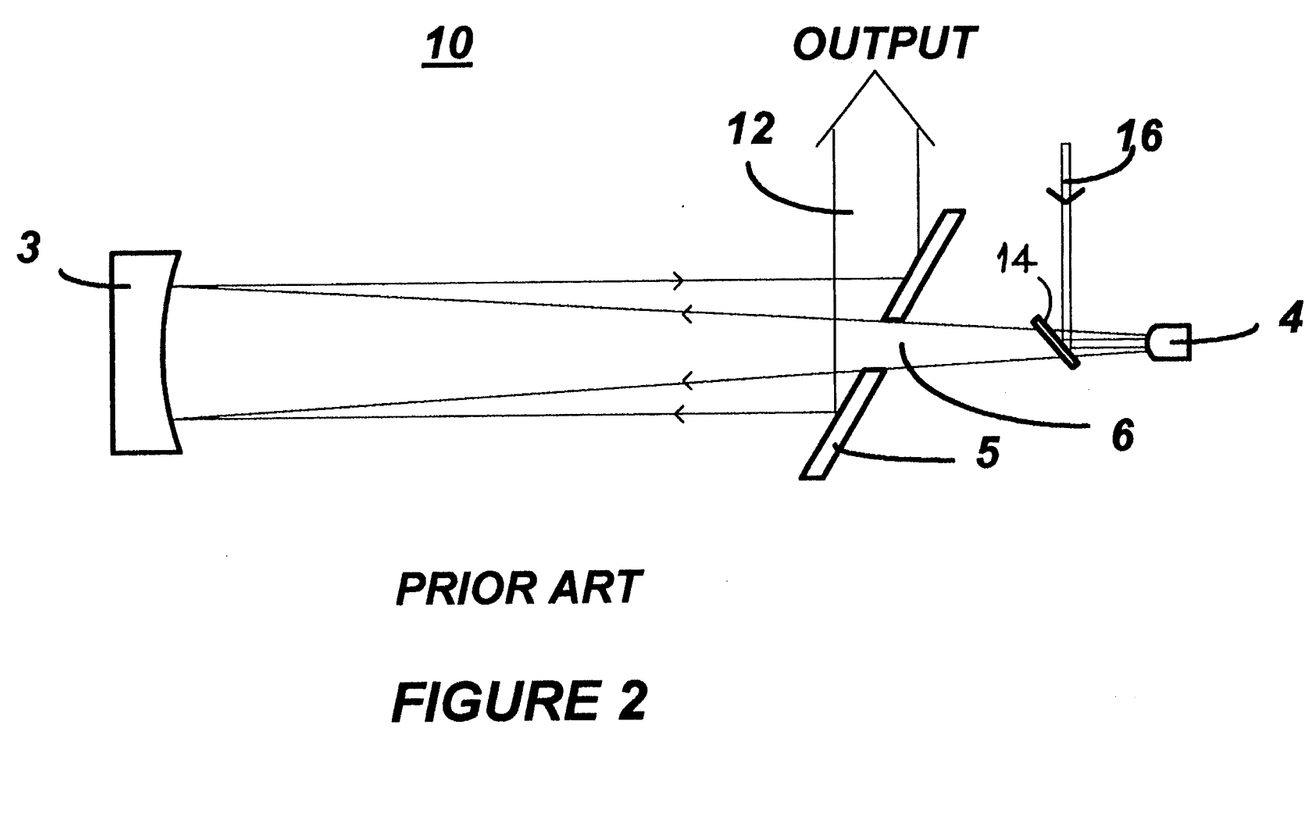
FIG. 2 is a simplified schematic elevational view of an injection-controlled laser resonator.

The most commonly used injection scheme is the phase matched injection which is achieved by matching the injected wavefront to the ISO divergent wavefront. FIG. 2 illustrates a conventional injection-controlled laser resonator 10, which is similar to the laser system 1 of FIG. 1, and which further includes an injection mirror 14 which reflects an incoming injection beam 16 toward the mirror 3, through the feedback aperture 6 of the scraper mirror 5.

However, it was found that the leading part of the ISO output consists of a re-amplified MO injection beam with its direction and collimation controlled by the injection beam. As soon as the seeding beam is extinguished, the ISO cavity modes start to dominate, and the laser beam output becomes ISO mode dominated, with its direction and collimation controlled by the ISO cavity. This characteristic, accompanied by small injection misalignment, results in undesirable multiple far-field (or focused) spots. In most laser applications, a single far-field spot is highly desirable.

Another concern is that the quality of the seeding beam is usually not diffraction limited, i.e., a laser beam quality can not be better than the diffraction limited, because of the imperfection of the master oscillator (MO) cavity design. This beam quality degradation will be carried over to the injection seeded oscillator (ISO) beam quality.

Yet another main concern associated with the use of an injection seeded oscillator (ISO) is the edge waves generated by the diffraction of the feedback beam at the feedback aperture. These edge waves induce small-scale phase aberrations and high order modes, which further enlarge the laser beam divergence.

It would therefore be highly desirable to have a new injection-controlled laser resonator which eliminates the dual far-field spots problem, improves the injection beam quality, and minimizes the edge waves effect, with diffraction limited beam quality.

SUMMARY OF THE INVENTION

It is an object of the present invention to address the foregoing concerns in injection-controlled laser resonators, and to provide adequate solutions thereto.

It is another object of the present invention to provide a new injection-controlled laser resonator which incorporates an adjoint-coupled feature, for achieving single far-field spots.

It is still another object of the present invention to provide a new injection-controlled laser resonator which incorporates a self-filtering feature, for improving the seeding beam quality.

It is yet another object of the present invention to provide a new injection-controlled laser resonator which incorporates a self-imaging feature, for minimizing diffraction induced small-scale phase aberrations and high order output modes, in order to improve the quality of the output laser beam.

It is a further object of the present invention to provide a new injection-controlled laser resonator for use in high gain, short pulse laser systems.

It is yet an additional object of the present invention to provide a new injection-controlled laser resonator with an off-axis resonator design, for use in laser systems having their highest gain along the wall of the laser tube, such as copper or metal vapor lasers.

Briefly, the foregoing and other objects are achieved by providing a new injection-controlled laser resonator incorporates self-filtering and self-imaging characteristics with an efficient injection scheme. A low-divergence laser signal is injected into the resonator, which enables the injection signal to be converted to the desired resonator modes before the main laser pulse starts. This injection technique and resonator design enable the laser cavity to improve the quality of the injection signal through self-filtering before the main laser pulse starts. The self-imaging property of the present resonator reduces the cavity induced diffraction effects and, in turn, improves the laser beam quality.

The injector-controlled laser resonator includes a gain medium, which is pumped with pump means which provides pump energy for pumping said gain medium to provide a pumped gain medium a first concave mirror disposed on one side of the pumped gain medium, a second concave mirror oppositely disposed relative to the second concave mirror with respect to the pumped gain medium. A scraper mirror is disposed intermediate the gain medium and the second concave mirror, and includes a generally central feedback aperture. An injection mirror is disposed intermediate the second concave, mirror and the scraper mirror, for reflecting, at least partially, an injection beam through the feedback aperture of the scraper mirror, toward the first concave mirror, via pumped the gain medium.

The injection beam is slightly convergent or collimated, so that it is reflected off of the injection mirror and trapped within a resonance cavity defined between the first and second mirrors. The resonance timing of the resonator is controlled, such that during a first trip of the injection beam from the injection mirror to the first mirror signal amplification does not start.

In the preferred embodiment, the injection beam makes at least two round trips within the resonance cavity, prior to the beam being converted into an ISO mode beam, before amplification starts. As the injection beam starts its second round trip after emerging from the feedback aperture, it starts to diverge and to convert into an ISO mode beam, and the ISO gain is started to provide amplification.

The injector-controlled laser resonator according to the present invention includes a self spatial filtering feature, wherein high angle rays of the injection beam are blocked by the scraper mirror, and only low angle rays are allowed to pass through the feedback aperture to impinge on the second mirror and to form cavity resonance. After the second round trip is completed, the injection beam is converged by the second mirror into a seeding beam which starts to diverge within the resonance cavity as soon as it passes through the feedback aperture, reaches the first mirror, and the ISO amplification starts, and further the operation of the laser resonator continues in an ISO resonance mode, which will be maintained for the entire duration of one or more laser pulses.

The first concave mirror has a first focal point and a first focal distance f1, and the second concave mirror has a second focal point and a second focal distance f2, such that the first and second focal points coincide with the feedback aperture of the scraper mirror at a confocal spot, in order to eliminate the edge wave diffraction effect, by having the second mirror converge the laser beam reflected therefrom, so that the laser beam does not contact the scraper mirror. Furthermore, the confocal spot satisfies the following equation:

$$f1+f2=L$$

for significantly minimizing the diffraction effect due to the long trajectory of the cavity round trips, and thus for eliminating diffraction rings and phase aberrations which would otherwise normally exist, and for obtaining a better laser beam quality.

BRIEF DESCRIPTION OF THE DRAWINGS

The above and other features of the present invention and the manner of attaining them, will become apparent, and the invention itself will be best understood, by reference to the following description and the accompanying drawings, wherein.

DETAILED DESCRIPTION OF THE PREFERRED EMBODIMENT

Figure 3:
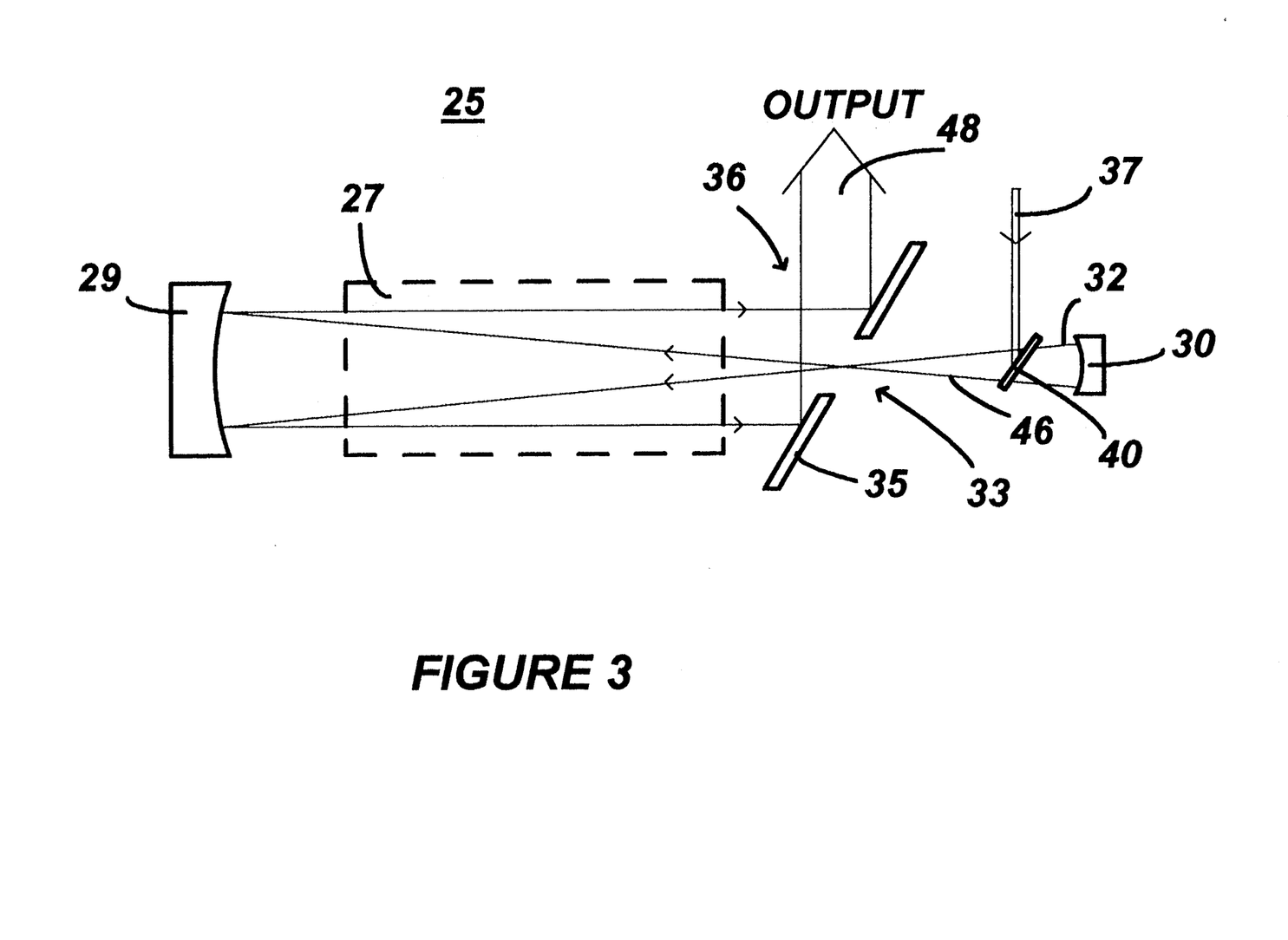
FIG. 3 is a simplified schematic elevational view of an injection-controlled laser resonator according to the present invention.

Referring now to the drawings, and more particularly to FIG. 3 thereof, there is illustrated an injector-controlled laser resonator 25 which eliminates the dual far-field spots problems associated with phase-matched injection, as well as the diffraction induced small-scale phase aberrations and high order output modes. The resonator 25 includes a suitably pumped gain medium 27, and a highly reflective concave mirror 29. Another highly reflective concave feedback mirror 30 is used instead of the conventional convex mirror, for converging a laser beam 32 impinging thereon, through a feedback aperture 33 (schematically shown as an opening in FIG. 3) formed in a scraper mirror 35. A resonance cavity 36 is formed within the two mirrors 29 and 30.

In operation, a slightly convergent or collimated injection beam 37 is formed by means of an external laser source (not shown). The injection beam 37 impinges upon an injection mirror 40, and causes part of it to be reflected inwardly, through the feedback aperture 33 of the scraper mirror 35, as a beam 42. This will hereinafter be referred to as an adjoint-coupled injection. The injection mirror 40 is made partially reflective so that it does not block the cavity resonance between the mirrors 29 and 30.

Figure 4:
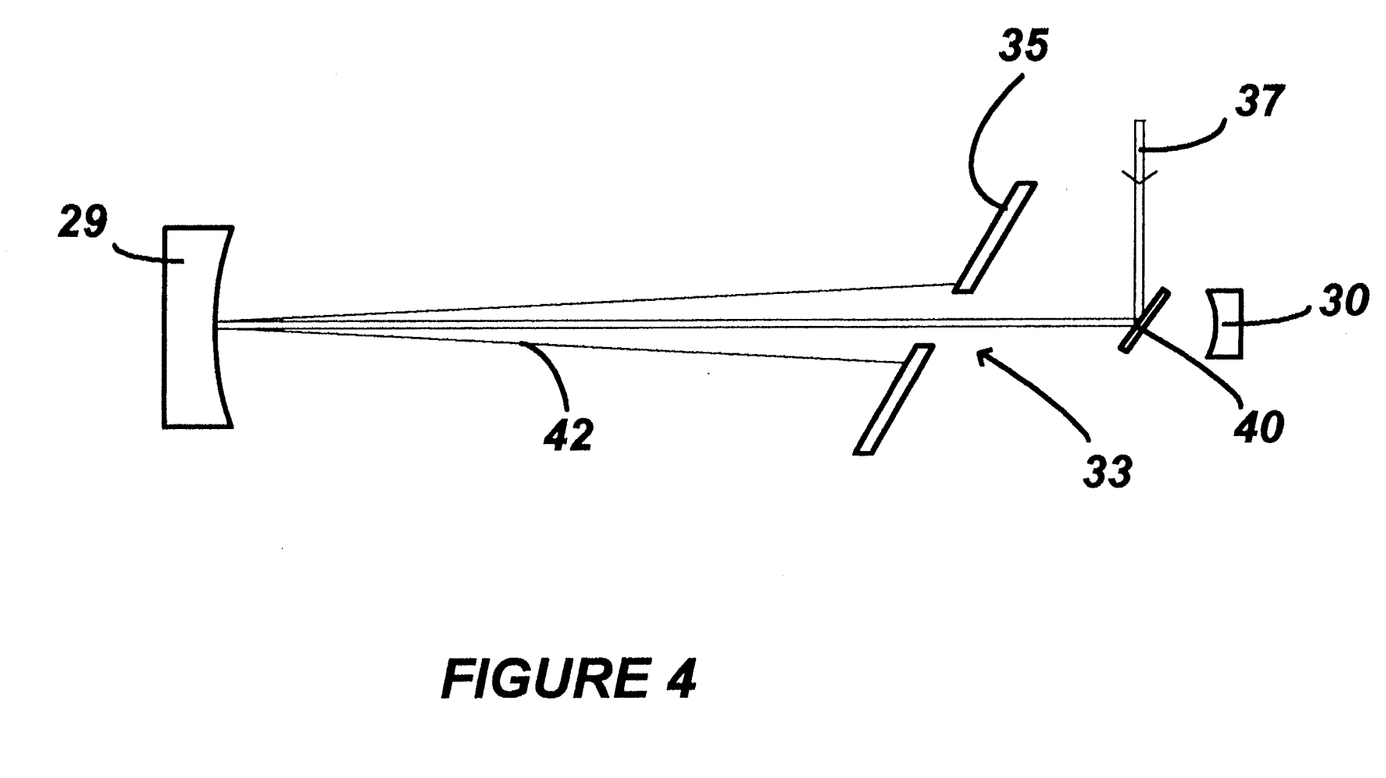
FIG. 4 is a simplified schematic elevational view of the injection-controlled laser resonator of FIG. 3, illustrating the self-filtering feature.

As illustrated in FIGS. 3 and 4, the injection beam 37 is either slightly convergent, or collimated, so that it would be reflected off of the injection mirror 40 as beam 42, which is trapped within the resonance cavity 36. The resonance timing of the resonator 25 is controlled, such that during the first trip or trajectory of the beam 42, from the injection mirror 40 to the mirror 29, the ISO is not started, and consequently, signal amplification does not start either.

The beam 42 impinges upon the mirror 29 and is reflected therefrom back onto the feedback mirror 30, through the resonance cavity 36 and the feedback aperture 33, thus completing its first round trip. While in conventional injection-controlled laser resonators, such as the laser resonator 10 shown in FIG. 2, the beam 42 makes one full round trip and is then outputed. The injection beam 42 is designed to make at least two round trips within the resonance cavity 36, so that the beam 42 is converted into an ISO mode beam before the ISO amplification starts.

As the beam 42 starts its second round trip toward the mirror 29, it starts to diverge and to convert into an ISO mode beam. At which time, the ISO gain is started to provide amplification, and the ISO resonance mode is automatically started.

One advantage achieved by the inventive injection-controlled laser resonator 25 is the self-filtering feature. In other terms, as illustrated in FIG. 4, the beam 42, which becomes slightly divergent after being reflected off of the mirror 29, because of the diffraction effect, passes partially through the feedback aperture 33, and its peripheral diverging portion impinges upon, is blocked by the scraper mirror 35, and is reflected thereby.

As a result of this "self spatial filtering", the high angle rays do not pass through the feedback aperture 33, and only the low angle waves[3] are allowed to pass through the feedback aperture 33 to impinge on the feedback mirror 30 and form the cavity resonance. The beam 42 is then converged by the feedback mirror 30 into a seeding beam 46 (FIG. 3), which starts to diverge within the resonance cavity 36, as soon as it passes through the feedback aperture 33, reaches the mirror 29, the ISO amplification starts, and the operation of the laser resonator 25 continues in an ISO resonance mode, which will be maintained for the entire duration of the laser pulse.

Therefore, the improved seeding beam 46 resulting from the spatial filtering has low divergence, and strictly ISO resonator mode, which lead to a better ISO output beam 48 than the conventional output beam 12 (FIG. 2) which uses phase-matched injection.

The next concern associated with the conventional laser resonators is the diffraction effect, which is being addressed and resolved by the present invention. The diffraction effect brings about two related concerns. The first concern is the generation of edge waves due to the diffraction at the edge of the feedback aperture 33; and the second concern is the long trajectory or propagation of the laser beam between the aperture 33 and the scraper mirror 35.

Figure 5:
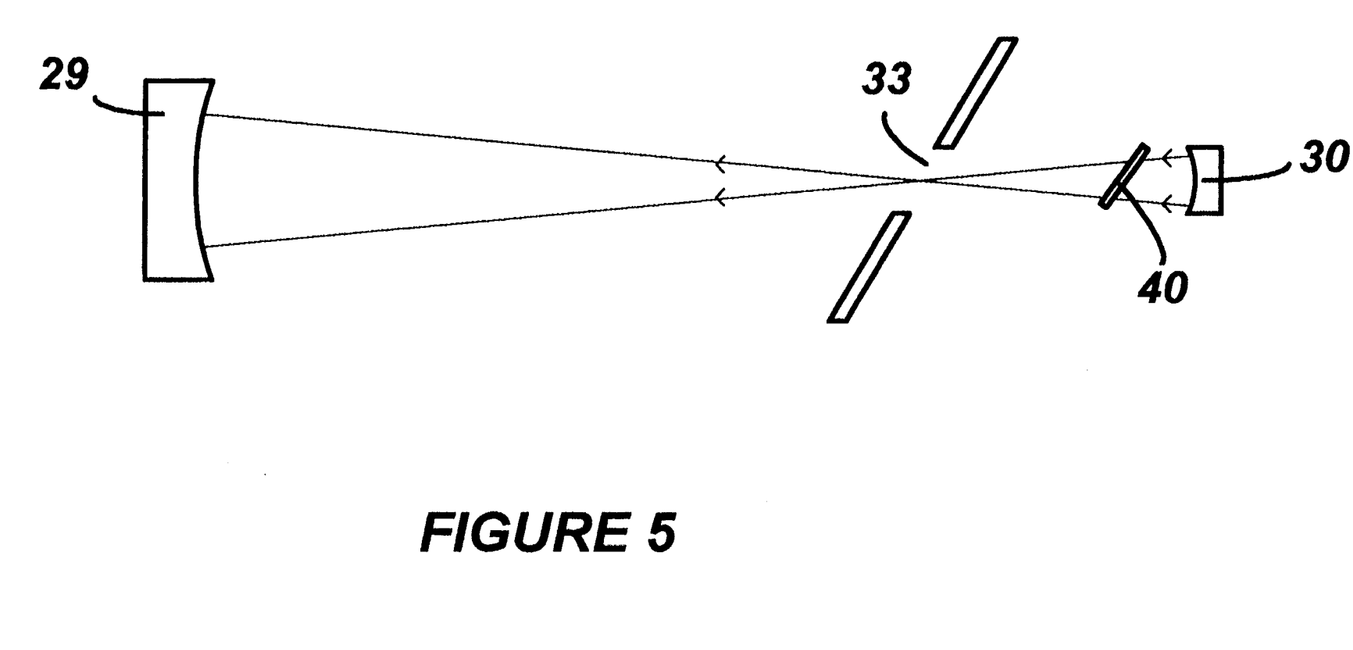
FIG. 5 is a simplified schematic elevational view of the injection-controlled laser of FIG. 3, illustrating the self-imaging feature.

The edge wave diffraction effect is significantly, if not totally eliminated by replacing the convex mirror 4 used in the conventional injection-controlled laser resonator shown in FIG. 2, with the concave feedback mirror 30. The concave mirror 30 converges the laser beam 32 so that it does not contact the scraper mirror 35. This is accomplished by having the focal point (confocal spot) of the feedback mirror 30 generally coincide with the feedback aperture 33 of the scraper mirror 35, as illustrated in FIG. 5.

The second concern, namely the long trajectory of the laser beam 32, accentuates the diffraction effect and causes the laser beam to have a non uniform intensity profile and an aberrated wavefront. This problem is resolved by having the confocal spot of the mirrors 29 and 30 coincide at the feedback aperture 33 of the scraper mirror 35, as illustrated in FIGS. 3 and 5, and satisfy the following equation:

$$f1 + f2L$$

where f1 is the focal distance of the feedback mirror 30, f2 is the focal distance of the mirror 29, and L is the distance between the two mirrors 29 and 30.

As a result, since the confocal point is at the center of the feedback aperture 33, the laser oscillator is said to be self-imaging, and the output beam at the scraper mirror 35 is an image of the feedback beam at the feedback aperture 33, which significantly minimizes the diffraction effect due to the long trajectory of the cavity round trips. As a result, since light diffraction occurs after propagation in space, the present inventive design, at least theoretically, eliminates the diffraction rings and phase aberrations that normally exist in the output beam using an unstable resonator. A better laser beam quality (i.e., lower beam divergence) is thus obtained.

In another embodiment of the present invention, the location of the injection beam, which in most cases is along the axis of the ISO laser gain medium (or laser tube), can also be shifted to an off-axis position in some types of lasers, such as copper or metal vapor lasers. A copper laser normally has the highest gain along the wall of the laser tube. A better injection seeding can be achieved along the higher region which requires an off-axis resonator. The present off-axis injection has proven to be better than on-axis injection in copper lasers.

The present injection-controlled laser resonator incorporates self-filtering, self-imaging and optionally off-axis resonator design with adjoint-coupled injection in a high gain, short pulse laser system, and has proven to achieve diffraction-limited beam quality.

While specific embodiments of the injection-controlled laser resonator have been illustrated and described, in accordance with the present invention, modifications and changes of the apparatus, parameters, materials, methods of manufacture, use and operation will become apparent to those skilled in the art, without departing from the scope of the invention.

What is claimed is:

1. An injector controlled laser resonator for generating a laser beam, comprising in combination:
   a. a gain medium including pump means for pumping said gain medium with pump energy to provide a pumped gain medium;
   b. a first concave reflective surface disposed of one side of said gain medium;
   c. a second concave reflective surface oppositely disposed relative to said second concave reflective surface with respect to gain medium;
   d. a scraper reflective surface disposed intermediate said gain medium and said second concave reflective surface, said scraper reflective surface including a generally central feedback aperture;
   e. an injection reflective surface disposed intermediate said second concave reflective surface and said scraper reflective surface, for reflecting, at least partially, an injection beam through said feedback aperture of said scraper mirror, toward said first concave reflective surface, through said pumped gain medium.

2. The injector-controlled laser resonator according to claim 1, wherein said injection beam is slightly convergent or collimated, so that it is reflected off of said injection reflective surface and trapped within a resonance cavity defined between said first and second reflective surfaces.

3. The injector-controlled laser resonator according to claim 2, having a resonance timing; and
   wherein said resonance timing is controlled, such that during a first trip of said injection beam from said injection reflective surface to said first reflective surface signal amplification through said pumped gain medium does not start.

4. The injector-controlled laser resonator according to claim 3, wherein said injection beam makes at least two round trips within said resonance cavity through said pumped gain medium, prior to said beam being converted into an ISO mode beam, before amplification starts.

5. The injector-controlled laser resonator according to claim 4, wherein, as said injection beam starts its second round trip after emerging from said feedback aperture, it starts to diverge and to convert into an ISO mode beam, and ISO gain is started to provide amplification.

6. The injector-controlled laser resonator according to claim 5, further including self spatial filtering feature, wherein high angle rays of said injection beam are blocked by said scraper reflective surface, and only low angle rays are allowed to pass through said feedback aperture to impinge on said second reflective surface and to form cavity resonance.

7. The injector-controlled laser resonator according to claim 6, wherein, after said second round trip is completed, said injection beam is converged by said second reflective surface into a seeding beam.

8. The injector-controlled laser resonator according to claim 7, wherein said seeding beam starts to diverge within said resonance cavity as soon as it passes through said feedback aperture, reaches said first reflective surface, and the ISO amplification starts, and further the operation of the laser resonator continues in an ISO resonance mode, which will be maintained for the entire duration of one or more laser pulses.

9. The injector-controlled laser resonator according to claim 8, wherein said first concave reflective surface has a first focal point and a first focal distance f1;
   wherein said second concave reflective surface has a second focal point and a second focal distance f2;
   wherein said first and second focal points coincide with said feedback: aperture of said scraper reflective surface at a confocal spot, in order to eliminate the edge wave diffraction effect, by having said second reflective surface converge the laser beam reflected therefrom, so that the laser beam does not contact said scraper reflective surface.

10. The injector-controlled laser resonator according to claim 9, wherein the position of said confocal spot satisfies the following equation:

$$f1 + f2 = L$$

for significantly minimizing the diffraction effect due to the long trajectory of the cavity round trips, and thus for eliminating diffraction rings and phase aberrations which would otherwise normally exist, and for obtaining a better laser beam quality.

11. The injector-controlled laser resonator according to claim 4, wherein said injection beam makes two round trips within said resonance cavity prior to said beam being converted into an ISO mode beam, before amplification starts.

12. The injector-controlled laser resonator according to claim 1, wherein the resonator is an off-axis resonator; and
   wherein said injection beam is an off-axis injection beam.

13. A method for operating an injector-controlled laser resonator having a pumped gain medium, for generating a laser beam, comprising the steps of:
   a. disposing a first concave reflective surface on one side of the pumped gain medium;
   b. disposing a second concave reflective surface oppositely disposed relative to said second concave reflective surface with respect to the pumped gain medium;
   c. disposing a scraper reflective surface intermediate the pumped gain medium and said second concave reflective surface; said scraper reflective surface including a generally central feedback aperture;

d. disposing an injection reflective surface intermediate said second concave reflective surface and said scraper reflective surface, for reflecting, at least partially, an injection beam through said feedback aperture of said scraper mirror, toward said first concave reflective surface, via the pumped gain medium;

e. collimating or slightly converging said injection beam, so that it is reflected off of said injection reflective surface and trapped within a resonance cavity defined between said first and second reflective surfaces.

14. The method according to claim 13, further including the step of controlling the resonance timing of the resonator such that during a first trip of said injection beam from said injection reflective surface to said first reflective surface signal amplification does not start.

15. The method according to claim 14, further including the step of causing said injection beam to make at least two round trips within said resonance cavity, prior to said beam being converted into an ISO mode beam, before amplification starts.

16. The method according to claim 15, further including the steps of having said injection beam diverge and convert into an ISO mode beam, and starting an ISO gain to provide amplification, as said injection beam starts its second round trip after emerging from said feedback aperture.

17. The method according to claim 16 further including the step of self spatial filtering said injection beam by blocking-high angle rays of said injection beam by said scraper reflective surface, and by allowing only low angle rays to pass through said feedback aperture to impinge on said second reflective surface and to form cavity resonance.

18. The method according to claim 17, further including the step of having said seeding beam start to diverge within said resonance cavity as soon as it passes through said feedback aperture.

19. The method according to claim 18, wherein said first concave reflective surface has a first focal point and a first focal distance f1;

wherein said second concave reflective surface has a second focal point and a second focal distance f2; and further including the step of coinciding said first and second focal points with said feedback aperture of said scraper reflective surface at a confocal spot, in order to eliminate the edge wave diffraction effect, by having said second reflective surface converge the laser beam reflected therefrom, so that the laser beam does not contact said scraper reflective surface.

20. The method according to claim 19, wherein the position of said confocal spot satisfies the following equation:

$$f1 + f2 = L$$

for significantly minimizing the diffraction effect due to the long trajectory of the cavity round trips, and thus for eliminating diffraction rings and phase aberrations which would otherwise normally exist, and for obtaining a better laser beam quality.

* * * * *